United States Patent Office 3,471,479
Patented Oct. 7, 1969

3,471,479
PROCESS FOR PREPARING ESTRADIOL 17-TRI-
METHYLACETATE AND INTERMEDIATES OB-
TAINED THEREFROM
Gunther Kruger, St. Laurent, Montreal, Quebec, and
David J. Marshall, Hampstead, Montreal, Quebec,
Canada, assignors to American Home Products Cor-
poration, New York, N.Y., a corporation of Delaware
No Drawing. Filed Mar. 20, 1967, Ser. No. 624,239
Int. Cl. C07c *169/24, 167/00, 167/14*
U.S. Cl. 260—239.55  8 Claims

ABSTRACT OF THE DISCLOSURE

There is disclosed herein a process for preparing estradiol 17-trimethylacetate from 6,19-oxido-17β-trimethylacetoxyandrost-4-en-3-one via the novel intermediates 3-acetoxy-6,19-oxido 17β-trimethylacetoxyandrosta-2,4-diene, 19-acetoxy-17β-trimethylacetoxyandrosta-1,4,6-trien-3-one, estradiol 3-acetate 17-trimethylacetate, 19-acetoxy - 2-chloro-17β-trimethylacetoxyandrosta-4,6-dien-3-one, and 6-dehydroestradiol 17-trimethylacetate, with or without isolation of the interemdiates.

The present invention relates to a process for preparing estradiol 17-trimethylacetate, a powerful, orally active estrogen which is approximately ten times more potent than estradiol itself in the Allen-Doisy test for estrogenic potency, and about five times more active than estradiol in the pregency-interrupting or anti-implantation test described by U. K. Banik et al. Soc. Exp. Biol. Med. 11, 595 (1962) and J. Pincus et al. Steroids 4, 657 (1964), but which has only about one quarter of the uterotrophic activity of estradiol.

It is a particular advantage of the process of this invention that it permits the preparation of estradiol 17-trimethylacetate by a convenient and efficient method starting from easily available material, without isolation or purification of any intermediates.

In principle, my process for preparing estradiol 17-trimethylacetate follows the route described below.

I prefer to use as starting material the compound 6,19-oxido 17β-trimethylacetoxyandrost-4-en-3-one which is obtained from 3β-acetoxy-5α-chloro-6,19-oxidoandrostan-17-one, prepared as described by H. Ueberwasser et al. in Helv. Chim. Acta. vol. 46, p. 344 (1063) which is reduced to the corresponding 17-hydroxy derivative; the latter compound is esterified with trimethylacetic acid and selectively hydrolyzed to yield the corresponding 5α-chloro - 3β-hydroxy-6,19-oxido-17β-trimethylacetoxyandrostane; oxidation of that latter compound and elimination of hydrogen chloride yields 6,19-oxido-17β-trimethyl-acetoxyandrost-4-en-3-one. Said last-named compound is treated with isopropenyl acetate in the temperature range of from room temperature to the boiling temperature of the mixture, for periods of time from 16 hours to 4 days at room temperature, or from 10 minutes to 4 hours at the boiling temperature of the mixture. Minor amounts of an acid catalyst have to be present, such as, for example, from 0.01 to 0.2 part per part of starting material of p-toluene-sulfonic acid or sulfuric acid. The first product of the above reaction is the 3-enol acetate of the starting material, 3 - acetoxy-6,19-oxido-17β-trimethyl-acetoxyandrosta-2,4-diene. If desired, that compound may be isolated, preferably by chromatography. Continued treatment of that latter compound with isopropenyl acetate in the presence of an acid catalyst as referred to above, or continuation of the initial reaction without isolation of said last-named compound opens the 6,19-oxido bridge.

A mixture is obtained, which consists principally of 10–20 percent estradiol 3-acetate 17β-trimethylacetate, the remainder of the mixture consisting of 3,19-diacetoxy-17β-trimethylacetoxyandrosta-2,4,6-triene. If desired this mixture may be separated, with 3,19-diacetoxy-17β-trimethylacetoxyandrosta-2,4,6-triene being isolated by crystallization, and estradiol 3-acetate-17β-trimethylacetate being obtained by chromatography of the mother liquors. If such separation is carried out, estradiol 3-acetate 17β-trimethylacetate may be hydrolyzed in an acid or alkaline medium to yield estradiol 17β-trimethylacetate.

It is surprising and unexpected that estradiol 3-acetate 17-trimethylacetate should be formed under the conditions of the above reaction. Its formation may be explained by assuming that in the opening of the 6,19-oxido bridge of 3-acetoxy-6,19-oxido-17β-trimethylacetoxyandrosta-2,4-diene a proton is lost from the 1-position rather than from the 7-position, thus forming a double bond in position 1,2 rather than in position 6,7 such as present in compound III. The hypothetical intermediate 3-acetoxy-19 - hydroxy-17β-trimethylacetoxyandrosta-1,3,5-triene, would then be expected to aromatize spontaneously, with expulsion of the 19-hydroxymethyl group as formaldehyde, to yield estradiol 3-acetate-17β-trimethylacetate.

3,19 - diacetoxy - 17β-trimethylacetoxyandrosta-2,4,6-triene is treated at room temperature with dichlorodicyanoquinone to yield 19-acetoxy-17β-trimethylacetoxyandrosta-1,4,6-trien-3-one which may be isolated if desired.

It is another particular advantage of the process of this invention that the introduction of the double bond in position 1,2 may be effected under much milder conditions than are necessary to carry out the same reaction with related Δ⁴-3-ketones, and with much less formation of by-products.

Alternatively, 3,19-diacetoxy-17β - trimethylacetoxyandrosta-2,4,6-triene in benzene solution may be treated for 1–10 minutes with calcium hypochlorite in aqueous acetic acid at room temperature. The resulting 19-acetoxy-2-chloro-17-trimethylacetoxyandrosta-4,6-dien-3-one is then treated for 12–24 hours in the temperature range of from 80–150° C. with a mixture of lithium chloride and lithium carbonate in dimethylformamide, to yield 19-acetoxy-17β-trimethylacetoxyandrosta-1,4,6-trien-3-one identical with the same product described above.

19-acetoxy-17β-trimethylacetoxyandrosta - 1,4,6 - trien-3-one, upon treatment with an acid on a base, aromatizes readily to yield 6-dehydroestradiol 17-trimethylacetate, which may then be reduced, preferably by means of hydrogen in the presence of a noble metal catalyst, to yield estradiol 17-trimethylacetate.

The following examples and formulae in which Ac represents the acetyl groups, will illustrate this invention.

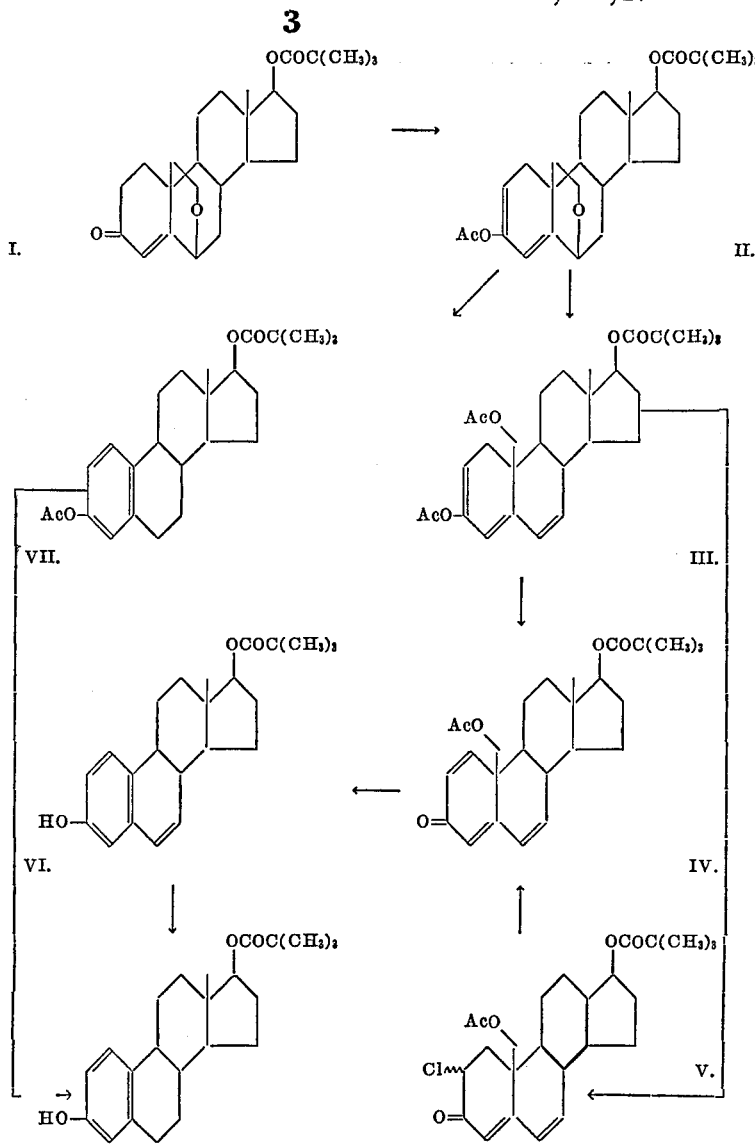

EXAMPLE 1

6,19-oxido-17β-trimethylacetoxyandrost-4-en-3-one (I)

To a solution of 10 g. of 3β-acetoxy-5α-chloro-6,19-oxidoandrostan-17-one in 30 ml. of methanol at 0° C. 0.80 g. of sodium borohydride is added over 2 minutes with stirring. The mixture is stirred for another 30 minutes in an ice bath, and then poured into 30 ml. of 2 N aqueous sulfuric acid. The precipitate is filtered off, washed well with water and dried at 80° in high vacuum for 16 hours yielding 9.0 g. of 3β-acetoxy-5α-chloro-6,19-oxido-17β-hydroxyandrostane.

A stirred mixture of 2 g. of the above compound, 10 ml. of pyridine and 2 ml. of trimethylacetylchloride is slowly heated to 100° during one hour and kept at this temperature for 30 minutes. The mixture is then poured into 50 ml. of water with stirring. The precipitate of crude 17β-trimethylacetate slowly solidifies on continued stirring and is filtered off, washed well with water and dried at 50° at high vacuum for 16 hours. The total crude product is then suspended in 20 ml. of methanol and stirred with 0.1 g. of potassium hydroxide at room temperature for 4 hours. The suspension is neutralized with 0.15 ml. of glacial acetic acid and diluted with 20 ml. of water. Filtration and washing with water gives 1.6 g. of crude 3β-hydroxy-5α-chloro-6,19-oxido-17β-trimethylacetoxyandrostane.

To a solution of 1.0 g. of the above 17β-trimethylacetate in 10 ml. of acetone, 2.0 ml. of 50% aqueous chromic acid is added over 1 hour with stirring whereupon the mixture is poured into 100 ml. of water. The precipitate of crude 5α-chloro-6,19-oxido-17β - trimethylacetoxyandrostan - 3-one is filtered off, washed well with water and dried over calcium chloride overnight. It is then refluxed with 2 ml. of pyridine for 15 minutes. Dilution with water and filtration gives 0.80 g. of crude 6,19-oxido-17β-trimethylacetoxyandrost-4-en-3-one which is purified by recrystallization from methanol and identified by elemental analysis as well as by NMR spectrography; M.P. 157–158° C.

$\lambda_{max.}^{EtOH}$ 238 (ε 14,320); $\nu_{max.}^{CHCl_3}$ 1715 and 1776 cm.$^{-1}$

EXAMPLE 2

3-acetoxy-6,19-oxido-17β-trimethylacetoxyandrosta-2,4-diene (II)

A solution of 20 g. of 6,19-oxido-17β-trimethylacetoxyandrost-4-en-3-one in 50 ml. of isopropenyl acetate is heated at 90° C. in an atmosphere of nitrogen for 10 minutes together with 2 g. of para-toluenesulfonic acid whereupon the mixture is cooled and divided into two equal halves. The first half is diluted with benzene, extracted 5 times with water and evaporated. The residue is chromatographed on Davidson silica gel, deactivated prior to use with wet ether. Elution with ether-hexane 1:1 gives first a fraction consisting of 3,19-diacetate and then a fraction yielding on evaporation a solid material which is recrystallized from methanol to give 3-acetoxy-6,19-oxido-17β-trimethylacetoxyandrosta-2,4-diene, M.P. 149–155° C.

$\nu_{max.}^{CHCl_3}$ 1747 and 1717 cm.$^{-1}$, $\lambda_{max.}^{EtOH}$ 264 mμ ($\epsilon$=6080)

and further identified by NMR spectrography.

EXAMPLE 3

3,19-diacetoxy-17β-trimethylacetoxyandrosta-2,4,6-triene (III)

The second half of the isopropenyl acetate solution obtained as described in Example 2 is further heated at 90° C. for another 2 hours and worked up as above. Recrystallization from methanol of the crude material obtained on evaporation yields the pure title compound; M.P. 147–148° C., $\nu_{max.}^{CHCl_3}$ 1725–1750, and 1670 cm.$^{-1}$, $\lambda_{max.}^{MeOH}$ 300 mμ ($\epsilon$ 14,250)

further identified by NMR spectrography and by elemental analysis.

EXAMPLE 4

Estradiol 3-acetate 17-trimethylacetate (VI)

Chromatography of the mother liquors obtained in Example 3 on silica gel (Davidson, deactivated by treatment with wet ether) and elution with benzene-ethyl acetate 10:1 yields the title compound, $\lambda_{max.}^{MeOH}$ 267, 276 mμ

EXAMPLE 5

19-acetoxy-17β-trimethylacetoxyandrosta-1,4,6-trien-3-one (IV)

A solution of 0.5 g. of 3,19-diacetoxy-17β-trimethylacetoxyandrosta-2,4,6-triene obtained as in Example 3, in 4 ml. of ether-tetrahydrofuran 3:2 is left at room temperature with 0.45 g. of dichlorodicyanoquinone for one hour and then at —5° C. for 2 hours. Filtration, extraction of the filtrate with water, evaporation and chromatography of the residue on silica gel gives, upon elutation with ethyl acetate-benzene 1:10 the title compound, $\lambda_{max.}^{MeOH}$ 222, 256 and 298 mμ

Alternatively, the same compound may also be obtained as described in Examples 6 and 7.

EXAMPLE 6

19-acetoxy-2-chloro-17β-trimethylacetoxyandrosta-4,6-dien-3-one

A solution of 13 g. of 3,19-diacetoxy-17β-trimethylacetoxyandrosta-2,4,6-triene in 26 ml. of benzene is shaken with a solution of 49 ml. of acetic acid and 13 g. of calcium hypochlorite in 2600 ml. of water for 3 minutes at room temperature. Extraction of the benzene phase with water, followed by evaporation and recrystallization of the residue from methanol gives 2.0 g. of the title compound; M.P. 95° C./141° C.;

$\lambda_{max.}^{EtOH}$ 285 mμ ($\epsilon$ 25,800); $\nu_{max.}^{CHCl_3}$ 1745, 1720, 1680, 1625, and 1595 cm.$^{-1}$ further identified by NMR spectrography and by elemental analysis.

EXAMPLE 7

Estradiol 17-trimethylacetate

A solution of 1 g. of 2-chloro-17β-trimethylacetoxy-19-acetoxyandrosta-4,6-dien-3-one, in 10 ml. of dimethylformamide is heated at 100° C. for 16 hours in presence of 0.12 g. of lithium chloride and 0.12 g. of lithium carbonate. Dilution with water followed by extraction with ethyl acetate and evaporation gives a resin consisting largely of 17β-trimethylacetoxy-19-acetoxyandrosta-1,4,6-trien-3-one. The resin is dissolved in 20 ml. of methanol and left to stand at room temperature with 0.2 g. of sodium hydroxide for 3 hours. Neutralization with glacial acetic acid, followed by evaporation yields 6-dehydroestradiol-17-trimethylacetate $\lambda_{max.}^{MeOH}$ 262, 304 mμ

The latter compound dissolved in 30 ml. methanol-benzene 1:1 and hydrogenated with palladium on charcoal gives estradiol 17-trimethylacetate, M.P. 229–231° C.

$\nu_{max.}^{CHCl_3}$ 3620, 3520, 1715, 1615, 1505, 1450 cm$^{-1}$ $\lambda_{max.}^{EtOH}$ 280 mμ ($\epsilon$ 2310)

after separation of the catalyst, evaporation and recrystallization of the crude product from methanol.

Alternatively, the same compound may also be obtained by selective alkaline hydrolysis of estradiol 3-acetate 17-trimethylacetate, obtained as described in Example 4.

EXAMPLE 8

Estradiol 17-trimethylacetate

A solution of 10 g. of 6,19-oxido-17β-trimethylacetoxyandrost-4-en-3-one, obtained as described in Example 1 in 20 ml. of isopropenyl acetate is heated at 90° C. with 1.0 g. of para-toluene sulfonic acid under nitrogen for 100 minutes. The mixture is cooled, diluted with 40 ml. of benzene, extracted five times with 10 ml. of water and evaporated. The residue is dissolved in 80 ml. of ether-tetrahydrofuran 3:2 and left to stand with 9.00 g. of dichlorodicyanoquinone for 1 hour at room temperature, whereupon the mixture is cooled to —5° C. Filtration, extraction of the filtrate with water, back extraction of the aqueous phases with ether and evaporation of the combined ethereal phase gives a resin which is dissolved in 50 ml. of methanol and left to stand with 1 g. of sodium hydroxide for 1 hour at room temperature whereupon the mixture is neutralized with glacial acetic acid, concentrated to a thick paste, diluted with a small volume of water and filtered. The crystalline material is hydrogenated in 66 ml. of methanolbenzene 1:1 with 0.220 g. of 5% palladium on charcoal followed by filtration, evaporation of the filtrate and recrystallization of the residue from ethanol-ethyl acetate to yield the title compound identical with the compound obtained in Example 7.

We claim:
1. 3 - acetoxy - 6,19 - oxido - 17β - trimethylacetoxyandrosta-2,4-diene.
2. 3,19 - diacetoxy - 17β - trimethylacetoxyandrosta-2,4,6-triene.
3. 19 - acetoxy - 17β - trimethylacetoxyandrosta - 1,4,6-trien-3-one.
4. 19 - acetoxy - 2 - chloro - 17β - trimethylacetoxyandrosta-4,6-dien-3-one.
5. The process of preparing estradiol 17-trimethylacetate which comprises treating 6,19-oxido-17β-trimethylacetoxyandrost-4-en-3-one with isopropenyl acetate in the presence of an acid catalyst at a temperature within the range room temperature to the boiling point of the mixture, thereby obtaining 3-acetoxy-6,19-oxido-17β-trimethylacetoxyandrosta - 2,4 - diene; further treating said last named compound with isopropenyl acetate in the presence of an acid catalyst at an elevated temperature thereby obtaining estradiol 3-acetate 17β-trimethylacetate and hydrolyzing said last named compound in a reaction medium selected from acid and alkaline media, thereby securing estradiol 17-trimethylacetate.
6. The process of preparing estradiol 17-trimethylacetate which comprises treating 6,19-oxido-17β-trimethylacetoxyandrost-4-en-3-one with isopropenyl acetate in the presence of an acid catalyst at a temperature within the range room temperature to the boiling point of the mixture thereby obtaining 3-acetoxy-6,19-oxido-17β-trimethylacetoxyandrosta-2,4-diene; continuing the treatment of said last named compound with isopropenyl acetate in the presence of an acid catalyst at an elevated temperature, thereby obtaining 3,19 - diacetoxy - 17β - trimethylacetoxyandrosta-2,4,6-triene; treating said last named compound at room temperature with dichlorodicyanoquinone, thereby obtaining 19 - acetoxy - 17β - trimethylacetoxyandrosta-1,4,6-trien-3-one; treating said last named compound with an agent selected from the group consisting of acids and bases thereby securing 6-dehydroestradiol 17-trimethylacetate; reducing said last named compound by treatment with hydrogen in the presence of a noble metal catalyst thereby securing estradiol 17-trimethylacetate.

7. The process of preparing estradiol 17-trimethylacetate which comprises treating 6,19-oxido-17β-trimethylacetoxyandrost-4-en-3-one with isopropenyl acetate in the presence of an acid catalyst at a temperature within the the range room temperature to the boiling point of the reaction mixture, thereby securing 3-acetoxy-6,19-oxido-17β-trimethylacetoxyandrosta-2,4-diene; treating said last named compound with isopropenyl acetate in the presence of an acid catalyst at an elevated temperature, thereby securing 3,19 - diacetoxy - 17β - trimethylacetoxyandrosta-2,4,6-triene; treating said last named compound with calcium hypochlorite in aqueous acetic acid at room temperature, thereby securing 19 - acetoxy - 2 - chloro - 17β - trimethylacetoxyandrosta-4,6-dien-3-one; treating said last named compound at an elevated temperature within the range 80° to 150° C. with a mixture of lithium chloride and lithium carbonate in dimethylformamide, thereby obtaining 19-acetoxy-17β-trimethylacetoxyandrosta - 1,4,6-trien-3-one; treating said last named compound with an agent selected from the group consisting of acids and bases thereby securing 6 - dehydroestradiol 17 - trimethylacetate; reducing said last named compound by treatment with hydrogen in the presence of a noble metal catalyst thereby securing estradiol 17-trimethylacetate.

8. The process for preparing estradiol 17-trimethylacetate which comprises treating 3,19-diacetoxy-17β-trimethylacetoxyandrosta-2,4,6-triene in benzene solution with calcium hypochlorite in aqueous acetic acid at room temperature, thereby securing 19-acetoxy-2-chloro-17β-trimethylacetoxyandrosta-4,6-dien-3-one; treating said last named compound at a temperature within the range 80° to 150° C. with a mixture of lithium chloride and lithium carbonate in dimethylformamide for a period of time ranging from 12 to 24 hours, thereby obtaining 19-acetoxy - 17β - trimethylacetoxyandrosta - 1,4,6 - trien - 3-one; permitting said last named compound to aromatize on standing, thereby securing 6-dehydroestradiol 17-trimethylacetate; and then reducing said last named compound by treatment with a reducing agent thereby obtaining estradiol 17-trimethylacetate.

References Cited

UNITED STATES PATENTS

| | | | |
|---|---|---|---|
| 2,921,064 | 1/1960 | Ringold et al. | 260—239.55 |
| 3,020,294 | 2/1962 | Djerassi et al. | 260—397.3 |
| 3,258,471 | 6/1966 | Alvarez | 260—397.4 |

ELBERT L. ROBERTS, Primary Examiner

U.S. Cl. X.R.

260—397.4, 397.5, 999